United States Patent
Sun et al.

(10) Patent No.: US 10,547,784 B2
(45) Date of Patent: Jan. 28, 2020

(54) IMAGE STABILIZATION

(71) Applicant: SighTour Technologies, Inc., New Taipei (TW)

(72) Inventors: Shi-Mu Sun, New Taipei (TW); Huah Tu, Taipei (TW)

(73) Assignee: SighTour Technologies, Inc., New Taipei (TW)

( * ) Notice: Subject to any disclaimer, the term of this patent is extended or adjusted under 35 U.S.C. 154(b) by 30 days.

(21) Appl. No.: 16/012,684

(22) Filed: Jun. 19, 2018

(65) Prior Publication Data

US 2018/0367733 A1  Dec. 20, 2018

Related U.S. Application Data

(60) Provisional application No. 62/521,982, filed on Jun. 19, 2017.

(51) Int. Cl.
| | | |
|---|---|---|
| H04N 5/232 | (2006.01) | |
| H04N 5/225 | (2006.01) | |
| G06T 7/20 | (2017.01) | |
| G06T 7/38 | (2017.01) | |
| G06T 7/80 | (2017.01) | |

(52) U.S. Cl.
CPC ..... H04N 5/23258 (2013.01); H04N 5/23267 (2013.01)

(58) Field of Classification Search
CPC ........... H04N 5/23258; H04N 5/23267; H04N 5/23238; H04N 5/225; G06T 7/20; G06T 7/38; G06T 7/80
USPC ............... 348/208.2, 208.99, 36, 239, 231.2, 348/333.05, 208.1, 425.4, 500, 513; 382/107, 215, 236, 255, 205, 289, 296, 382/297, 154, 285, 190, 191, 19, 2, 195, 382/201, 206, 243, 309; 375/240.1, 293, 375/145, 149, 354, 240.28, 355, 240.16, 375/240.08; 715/700, 728, 223, 235, 255, 715/723, 732; 702/196, 85, 95; 73/1.75, 73/1.77; 74/504, 508, 5.9
See application file for complete search history.

(56) References Cited

U.S. PATENT DOCUMENTS

| | | |
|---|---|---|
| 8,488,010 B2 | 7/2013 | Voss et al. |
| 8,558,903 B2 | 10/2013 | Liu et al. |
| 8,675,081 B2 | 3/2014 | Klomp |
| 8,743,219 B1 * | 6/2014 | Bledsoe ............... H04N 5/225 348/208.4 |
| 8,896,713 B2 | 11/2014 | Corey et al. |
| 8,964,045 B2 | 2/2015 | Shah et al. |
| 2010/0290769 A1 * | 11/2010 | Nasiri ................... G03B 17/00 396/55 |

(Continued)

*Primary Examiner* — Marly S Camargo
(74) *Attorney, Agent, or Firm* — Venture Pacific Law, PC (57) ABSTRACT

A camera having a gyro and accelerometer stabilizes a video recording by the following steps. First, gyro data and acceleration data are synchronized with a frame of video data. The gyro data and the acceleration data are fused together to get a space domain rotation matrix that corresponds to the frame. The frame is adjusted based on the space domain rotation matrix. Next, at least one feature of the adjusted frame is detected. A modified rotation matrix is determined by comparing the at least one detected feature of the adjusted frame with a corresponding feature in a neighboring frame of the video data. Finally, the adjusted frame is further adjusted based on the modified rotation matrix.

20 Claims, 9 Drawing Sheets

(56) References Cited

U.S. PATENT DOCUMENTS

| | | | |
|---|---|---|---|
| 2011/0096832 A1* | 4/2011 | Zhang | H04N 7/12 375/240.08 |
| 2011/0109755 A1* | 5/2011 | Joshi | G06T 7/20 348/208.5 |
| 2013/0044228 A1* | 2/2013 | Corey | H04N 5/23274 348/208.4 |
| 2013/0127983 A1* | 5/2013 | Wang | H04N 13/02 348/208.99 |
| 2014/0146205 A1* | 5/2014 | Xu | H04N 5/272 348/239 |
| 2015/0222818 A1* | 8/2015 | Karpenko | H04N 5/23267 348/208.6 |
| 2017/0180647 A1* | 6/2017 | Karpenko | H04N 5/23267 348/208.6 |
| 2017/0243374 A1* | 8/2017 | Matsuzawa | G06T 7/80 398/158 |
| 2018/0063440 A1 | 3/2018 | Kopf | |

* cited by examiner

IMAGE STABILIZATION

CROSS REFERENCE

This application claims priority from a provisional patent application entitled "Method and System for Image Processing" filed on Jun. 19, 2017 and having application No. 62/521,982. Said application is incorporated herein by reference.

FIELD OF INVENTION

The present disclosure relates to video stabilization, and, in particular, to a method, system, and apparatus for video stabilization using rotation matrices and feature analysis.

BACKGROUND

Cameras can be used to capture a sequence of images to be used as frames of video data. Cameras may be fixed to stable objects, for example a camera may be mounted on a stand such as a tripod to thereby keep the camera still while the video frames are captured. However, often cameras may be incorporated in mobile devices and are not necessarily mounted to fixed objects, for example a camera may be held, or may be on a moving object such as a vehicle or bicycle. Movement of the camera while the camera is capturing frames of video data may result in movement in the video itself, which is highly undesirable and difficult to watch.

Image stabilization is a method that can be used to compensate for the unwanted movement in video data. Some systems perform motion estimation in order generate motion vectors for use by an image stabilization process. Image stabilization algorithms may consist of three main parts: motion estimation, motion smoothing, and motion compensation. A motion estimation block may estimate local motion vectors within the video signal and on the basis of these local estimates calculate a global motion vector. A motion smoothing block may then deal with filtering of the estimated global motion vector in order to smooth the calculated value and prevent large and undesirable differences between motion vectors calculated previously. A motion compensation block may then shift an image in the opposite direction to the filtered global motion vector to thereby stabilize the video signal. However, these video stabilization methods require a large of amount of processing power.

In recent years, motion sensors have become simpler and cheaper to manufacture and the size of motion sensors has reduced significantly. It is now feasible to implement motion sensors in mobile devices. Motion sensors generate data representing the motion of the sensor.

Therefore, there exists a need for an improved video stabilization method and system that can incorporate the use of motion sensors and also feature analysis.

DESCRIPTION OF THE DRAWINGS

The following detailed description together with the accompanying drawings in which the same reference numerals are sometimes used in multiple figures to designate similar or identical structural elements, provide a better understanding of the nature and advantages of the present disclosure.

DETAILED DESCRIPTION

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the claims section.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but it may have additional steps not included in the present disclosure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk ("CD") or digital versatile disk ("DVD"), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Figure 1:
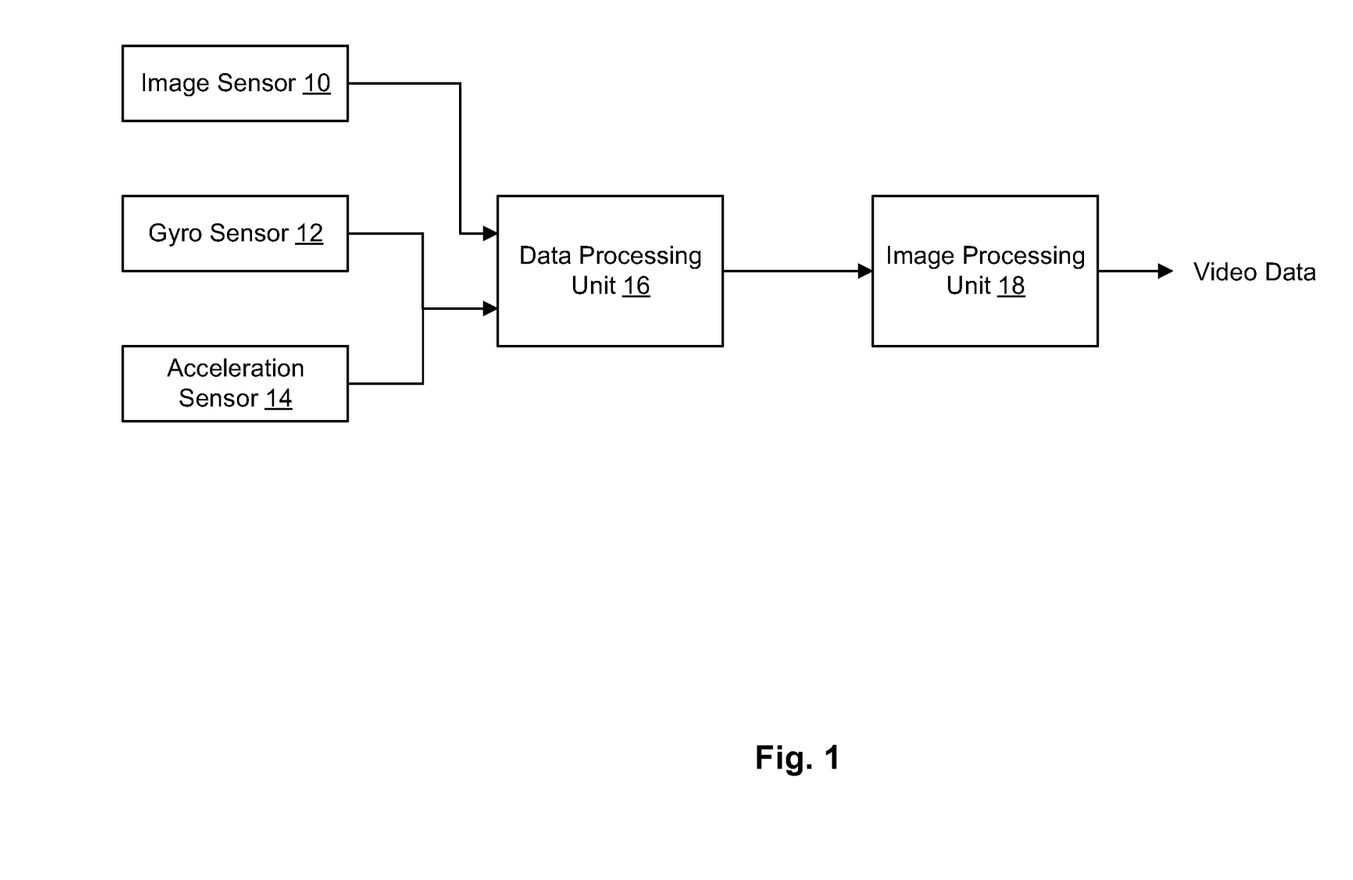
FIG. 1 illustrates a block diagram of components of a video stabilization system of the present disclosure.

FIG. 1 illustrates a block diagram of components of a video stabilization system of the present disclosure. A video stabilization system of the present disclosure comprises an image sensor 10, a gyro sensor 12, an acceleration sensor (also can be referred to as an accelerometer) 14, a data processing unit 16, and an image processing unit 18. It can be appreciated that the data processing unit 16 and the image processing unit 18 can be implemented by a single central processing unit ("CPU") or an application specific processor. The image sensor 10 can be a charge-coupled device ("CCD"), a CMOS transistor-based image sensor, or other light sensor. Furthermore, the image sensor 10, gyro sensor 12, and acceleration sensor 14 can be implemented in a mobile device (e.g., a hand-held camera, a smart phone, a computing tablet, or other portable device). The data processing unit 16 and the image processing unit 18 can be located in the respective mobile device such that the video processing can be performed within the mobile device without any additional devices needed. However, it can be appreciated that the data processing unit 16 and the image processing unit 18 can also be located in separate devices, e.g., in a camera and in one of the following: a desktop computer, a server, a laptop, a smart phone, or other computing device for processing the recorded video.

The image sensor 10 can record an image and send the raw data of the image to the data processing unit 16 at a rate of 30 frames per second (or other frame rate depending on the design and the capabilities of the respective camera and the processing units 16 and 18). The gyro sensor 12 measures the rotation about three perpendicular axes, which is indicative of the rotation of the respective mobile device in which the gyro sensor 12 resides. The acceleration sensor 14 measures the acceleration along the three axes, which is indicative of the acceleration along each axis of the respective mobile device in which the acceleration sensor 14 resides. The frequency of sampling can be equal to a frame rate or higher than the frame rate such that the gyro data and acceleration data can be synchronized with the frames captured by the image sensor 10. It can be appreciated that the sampling frequency can also be less and/or not synchronized to the frame rate by interpolating gyro data and acceleration data based on the sampled data.

The data processing unit 16 can merge the video data, the gyro data, and the acceleration data by matching time stamps of the respective data. The gyro data and the acceleration data can be associated with a particular frame of video data from the image sensor 10. The data processing unit 16 can prepare the raw video data into a video file format, e.g., MPEG or other video format, and have a second file (referred to as an "eye file") for the corresponding gyro and acceleration data.

In another embodiment, the data processing unit 16 can combine the raw video data and the corresponding gyro and acceleration data into a single file where the corresponding gyro data and acceleration data are encapsulated in a metadata container of the video file.

The video file and the corresponding gyro data and acceleration data are sent to the image processing unit 18 for horizontal and stability adjustments. The image processing unit 18 transforms the pixels of a frame based on the corresponding gyro data and acceleration data into a new adjusted frame that compensates for any movement of the camera. One or more adjusted frames are outputted by the image processing unit 18 as video data for playback or for further postprocessing.

Figure 2:
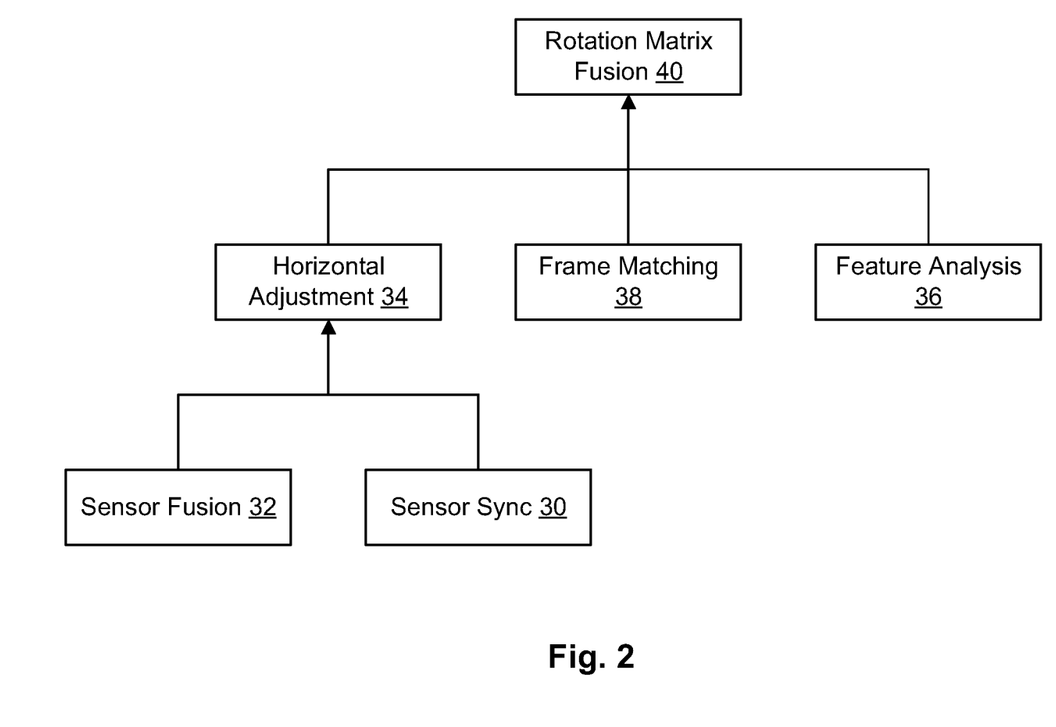
FIG. 2 illustrates a flow chart for a method for video stabilization of the present disclosure.

FIG. 2 illustrates a flow chart for a method for video stabilization of the present disclosure. A flow chart for a method for video stabilization can be implemented in hardware and/or software as designed. In an embodiment, a video stabilization computer-program product can be tangibly embodied in a non-transitory machine-readable storage medium, including instructions configured to cause one or more data processors to perform the following actions.

In a sensor synchronization step 30, gyro data, and acceleration data are synchronized with a frame of video data. In an embodiment, the gyro data, the acceleration data, and the frame data are each timestamped. Furthermore, the gyro data, the acceleration data, and the frame data can be synchronized based on matching the respective timestamps of the gyro data, the acceleration data, and the frame. If the timestamps for the data do not exactly match then normalization and/or interpolation of the sampled gyro data and acceleration data can be applied to better match the timestamps of the frames.

Next, in a sensor fusion step 32, the gyro data and the acceleration data are fused together using an algorithm to get a space domain rotation matrix that corresponds to the frame. In an embodiment, a Kalman filter can be applied to increase the accuracy and filter out the sensor noise for the gyro data and the acceleration data. Next, the filtered acceleration data is used as the component of a gravity vector to get an orientation and the gyro data is used as the angular velocity to get an instant orientation. A Madgwick filter can be applied to compensate for any long-term drift to obtain a space domain rotation matrix.

The space domain rotation matrix for each frame represents an orientation of the frame's captured plane in 3-dimensional space. To convert the frame back to a horizontal view for a viewer, the frame's captured plane is projected back to world coordinates. In a method to project the frame's captured plane back to the world coordinates, each pixel on the frame can be multiplied by an inverse of the space domain rotation matrix to position that frame back into the world coordinates.

The image from the frame can be transformed into a horizontal view by projecting the pixels of the frame into world coordinates. Adjustments to each successive frame thereafter can also be done in succession such that each successive frame can also be adjusted. The space domain rotation matrix for each of the next frames can be relative to the orientation of an original frame, i.e., a first frame, F(0). For each successive frame, a space domain rotation matrix can be calculated that is relative to the first frame F(0) and any other previous frames. For instance, if the first frame is F(0), then next frames can be in the following order of F(1)', F(2)', F(3)', etc. A space domain rotation matrix can be denoted as R(a→b) function, where a is a previous frame number and b is a current frame. Therefore, the adjusted frames in succession can be as follows:

$$F(1)'=R(0\rightarrow 1)*F(0); \quad \text{EQ[1]}$$

$$F(2)'=R(1\rightarrow 2)*R(0\rightarrow 1)*F(2); \quad \text{EQ[2]}$$

$$F(3)'=R(3\rightarrow 2)*R(1\rightarrow 2)*R(0\rightarrow 1)*F(3); \text{ and} \quad \text{EQ[3]}$$

$$F(n)'=R(n\rightarrow n-1)*R(n-1\rightarrow n-2)* \ldots *R(1\rightarrow 2)*R(0\rightarrow 1)*F(n). \quad \text{EQ[4]}$$

As shown in EQ[1] through EQ[4], above, each later adjusted frame can have an orientation that is matched to the original frame F(0) via the space domain rotation matrices which are compounded together for each successive frame.

It can be appreciated that other algorithms can be applied to combine the gyro data and the acceleration data. Furthermore, a magnetometer can be added to the respective camera recording the video frames to further improve the space domain rotation matrix for the frame by monitoring magnetic shifts.

In a horizontal adjustment step 34, the space domain rotation matrix can then be used to adjust the frame to align its orientation with an original frame (also referred to as a first frame). For instance, if the respective camera is initially recording video by being held in a vertical orientation for the original frame, and then if the camera is rotated 180 degrees such that the video is now upside down but directed in the same viewing direction, the horizontal adjustment would detect such angular rotation and flip the upside down recorded video to match the orientation of the initial recording. During playback of such adjusted frames, the video would play seamlessly by having the orientation of the original frame regardless of the movement or changes in orientation of the camera.

An inverse of the space domain rotation matrix can be applied to pixels of the frame to transform the position of the pixels to generate an adjusted frame. The frame can be further cropped to display a specific view. Thus, when the video is played from the first frame to the adjusted frame, any shaking of the respective camera can be minimized.

In another embodiment, if a corresponding rotation angle for the space domain rotation matrix is greater than a first predefined angle, then the space domain rotation matrix is adjusted to be set to a second predefined angle, where the second predefined angle is less than the first predefined angle. The inverse of the adjusted space domain rotation matrix is applied to the pixels of the frame. The purpose of setting the angle to the second predefined angle is to get a smooth panning of the video data.

With the adjusted frame, a feature analysis step 36 can be performed in which at least one feature is detected in the adjusted frame. The feature analysis can be performed using existing methods including, an AKAZE algorithm, an ORB algorithm, a SIFT algorithm, a SURF algorithm, a BRISK algorithm, a KAZE algorithm, or other feature analysis algorithm. The particular algorithm can be selected based on preferred design preferences or results.

Next, in a frame matching step 38, a modified rotation matrix is determined for the adjusted frame by comparing the detected feature(s) of the adjusted frame with a corresponding feature in a neighboring frame of the video data. The neighboring frame can be one or other frames preceding or proceeding the adjusted frame in time. In an embodiment, in step 34, an earlier frame can be horizontalized to become the adjusted frame. Thus, in step 38, feature matching for the frame and a next neighboring frame can be performed by comparing feature(s) of the neighboring frame to get a modified rotation matrix for the adjusted frame.

Image stabilization can be further refined by comparing a feature in the adjusted frame with the feature in the neighboring frame. The modified rotation matrix is calculated to determine the space position difference of pixels in the adjusted frame with the pixels in neighboring frame.

In an embodiment for determining the modified rotation matrix, the determination can comprise the steps of: identifying the corresponding feature in the neighboring frame of the video data that matches the at least one detected feature of the adjusted frame; calculating the pixel space domain rotation by comparing pixels of the detected feature of the adjusted frame with corresponding pixels of the corresponding feature in the neighboring frame; and generating the modified rotation matrix based on the calculated pixel space domain rotation.

Lastly, in the rotation matrix fusion step 40, the adjusted frame can be adjusted based on the modified rotation matrix. In an embodiment for further adjusting of the adjusted frame, an inverse of the modified rotation matrix can be applied to pixels of the adjusted frame to generate a modified adjusted frame that further compensates for any movement of the respective camera. When the video is played from the original frame to the modified adjusted frame(s), any shaking of the respective camera can be further minimized.

Figure 3:
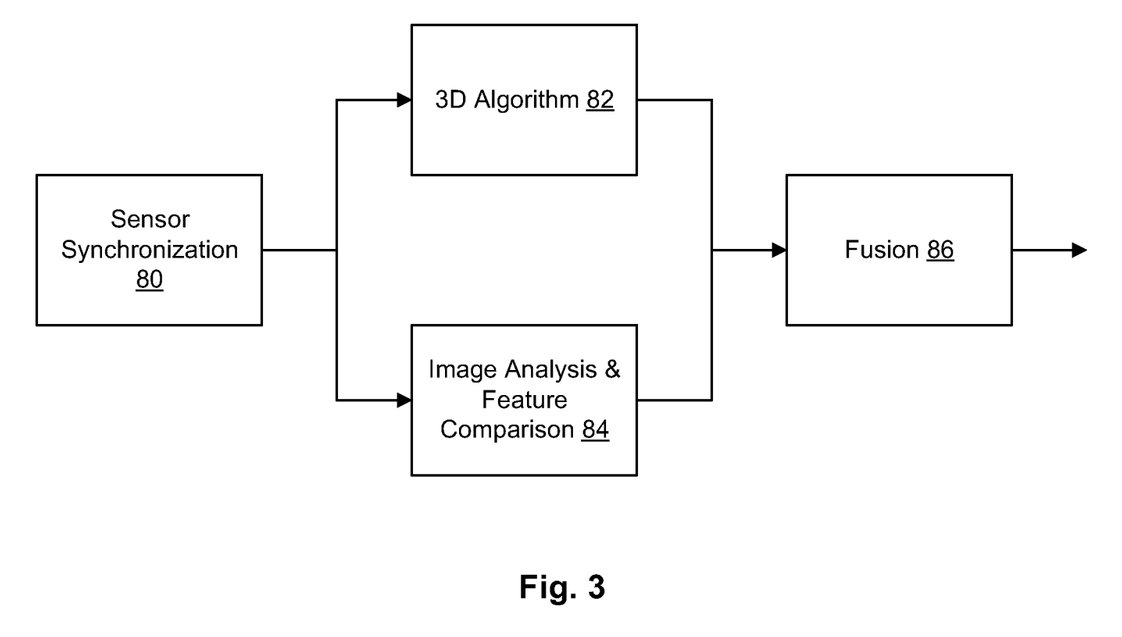
FIG. 3 illustrates a high-level flow chart for a method for video stabilization of the present disclosure.

FIG. 3 illustrates a high-level flow chart for a method for video stabilization of the present disclosure. In another embodiment for video stabilization, a method can comprise a first step of sensor synchronization 80 to synchronize a gyro sensor, acceleration sensor, and image data. Next, a 3D algorithm to determine a space domain rotation matrix can be applied 82 using the camera position that houses the gyro sensor, the acceleration sensor, and the image data.

With the synched sensor data and video data, an image analysis and feature comparison can be applied 84 to apply the feature analysis to get a modified space rotation matrix. Finally, the frames of the video data can be adjusted in a fusion step 86 by applying an inverse of the space domain rotation matrix to get an adjusted frame, and then applying the modified space rotation matrix to get a further modified frame. The other frames of the video data can also be adjusted in a similar manner to get other modified frames relative to a first frame to compensate for any movement of the camera. The modified frames can then be played in time sequence to view a more stable version of the video data.

Figure 4A:
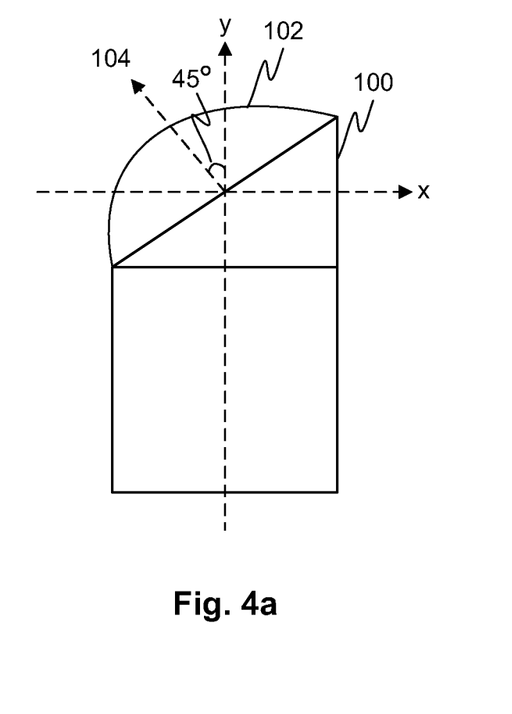
FIGS. 4a-4b illustrates an embodiment of a camera using a video stabilization system of the present disclosure.
Figure 4B:
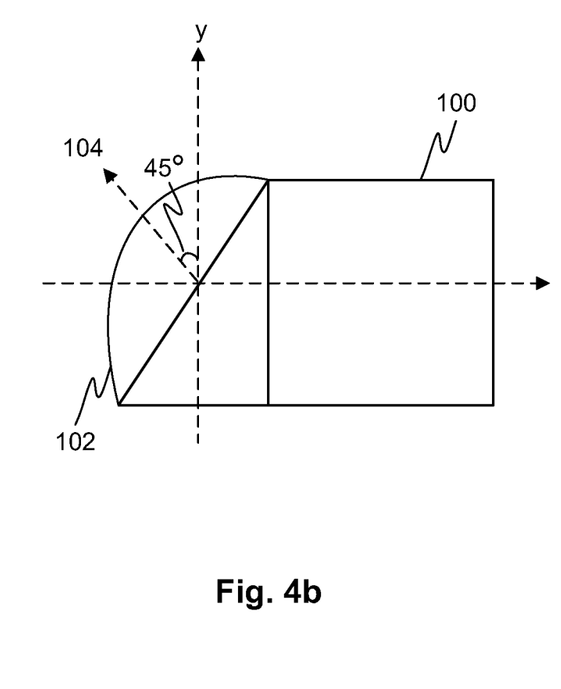

FIGS. 4a-4b illustrates an embodiment of a camera using a video stabilization system of the present disclosure. Referring to FIG. 4a, a camera 100 having a fisheye lens 102 with a recording angle of about 240 degrees (or other degree range depending on the design of the fisheye lens 102). The camera 100 can be positioned in a vertical position, where the body of the camera 100 can run along parallel to a y-axis. With such orientation, a shooting direction 104 for the fisheye lens 102 can be set at 45 degrees from the y-axis.

Referring to FIG. 4b, the camera 100 can be positioned in a horizontal position where the body of the camera 100 can run along parallel to an x-axis. The shooting direction 104 can be unchanged due to the geometry of the fisheye lens 102 relative to the body of the camera 100 and to the y-axis and the x-axis. If the camera is flipped during video recording from a vertical position to a horizontal position, then the video recording would be inverted during playback when this transition occurs since a position is typically locked when the video recording is started.

In order for a seamless video recording regardless of movement in the orientation of the camera, a stabilization method of the present disclosure can be applied to the video recording to account for such transition. In particular, by using an inverse of the space domain rotation matrix, the recorded view from the horizontal position can be flipped to match any video previously recorded in a vertical position. Likewise, the recorded view from the vertical position can be flipped to match any video previously recorded in a horizontal position.

Figure 5:
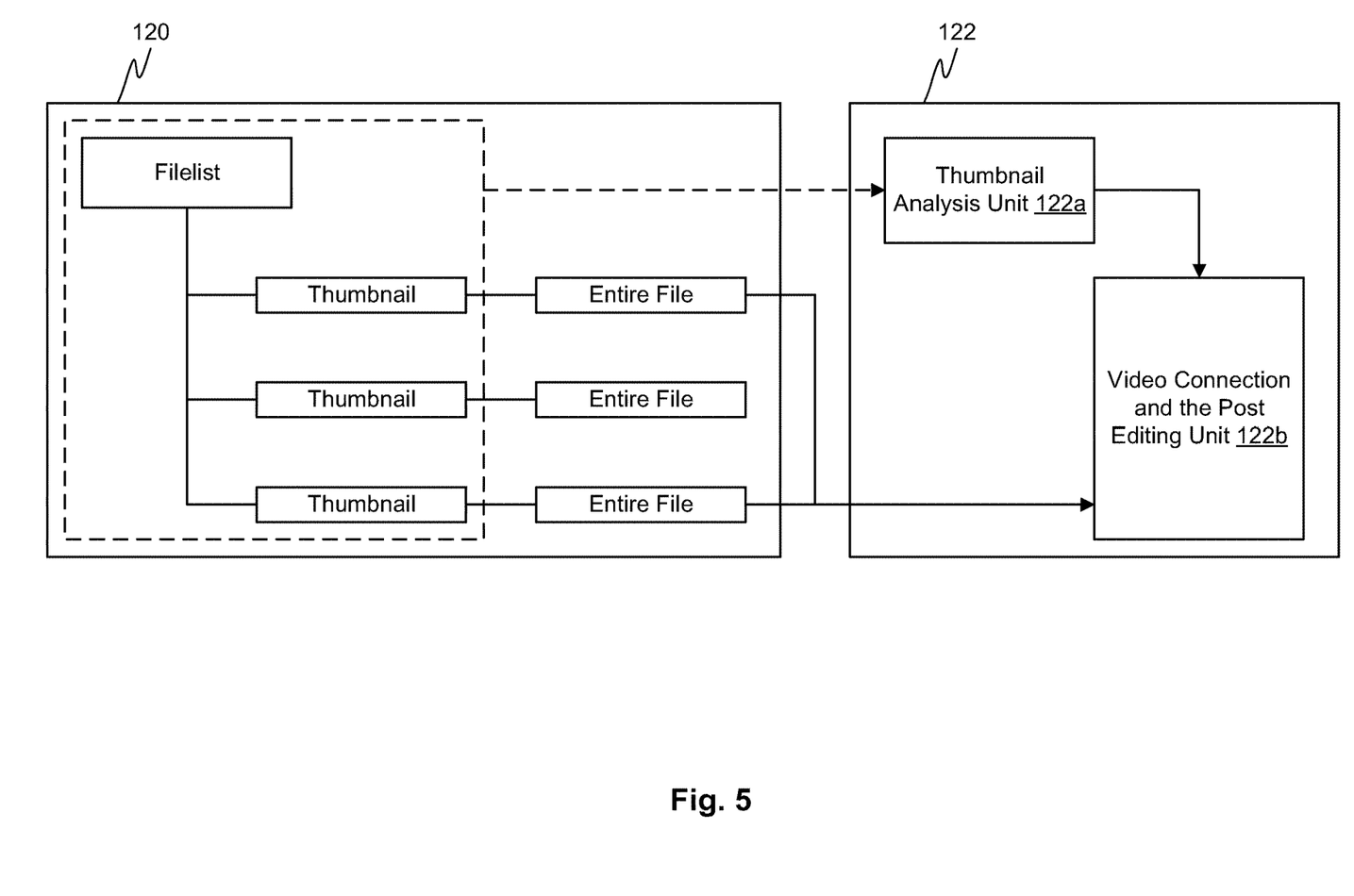
FIG. 5 illustrates a block diagram of a video generation system of the present disclosure.

FIG. 5 illustrates a block diagram of a video generation system of the present disclosure. A video generation system can comprise a camera 120 and a mobile device 122. The camera 120 can record video data into its internal memory. The recorded video data can be structured internally with a file list having a thumbnail for each file. The various video/image files can be sequentially listed in the file list.

The mobile device 122 can comprise a thumbnail analysis unit 122a and a video connection and post editing unit 122b. The thumbnail analysis unit 122a can read the thumbnail information and metadata for the respective video or image file to generate a weighted average for the videos in the file list of the camera 120. Once the specific weights are decided, then the post editing unit 122b can gather the specific videos and images based on the weights to generate a new video as a collection of the highlights of the video files that are recorded in the camera 120. It can be appreciated that the camera 120 and the mobile device 122 can be implemented in the same device.

Figure 6:
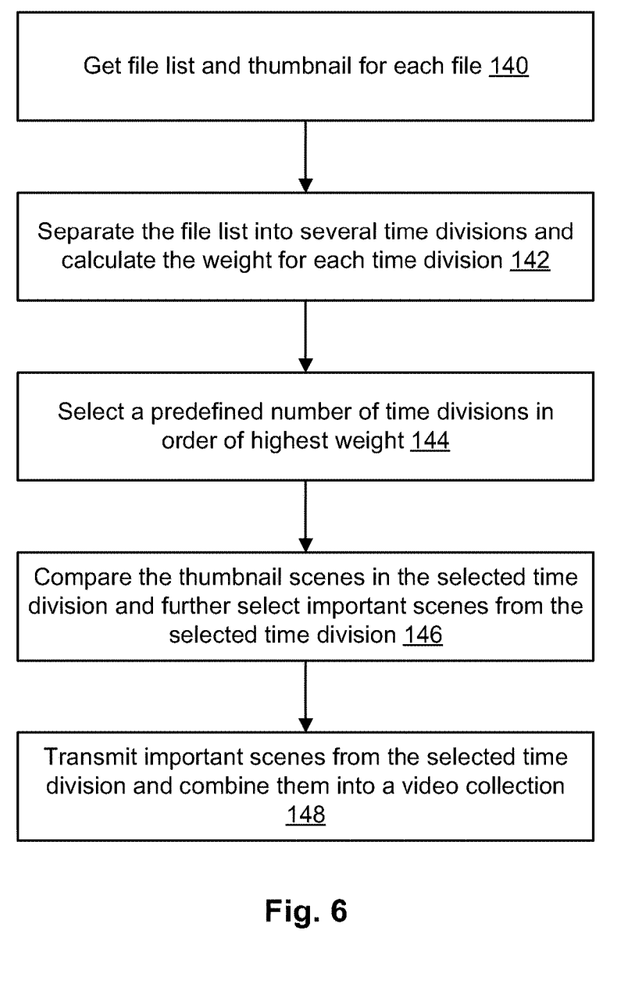
FIG. 6 illustrates a flow chart for a video generation method of the present disclosure.

FIG. 6 illustrates a flow chart for a video generation method of the present disclosure. The video generation method can comprise the following steps. First, a get file list and thumbnail for each file is performed, step 140. Next, in step 142, the files in the file list are separated based on a time division (e.g., every hour or other predefined time span in which a respective video or image was recorded on). Weights can then be calculated for each file in each time division.

In step 144, a predefined number of time divisions in order of highest weighted sums can be selected as an important time span for video generation. A target video to be generated can be split into a predefined number of video sections (e.g., 3 parts) to be filled from the recorded images and videos of the camera. The top three-weighted time divisions of the recoded camera can be selected to fill in each respective section of the target video.

Thumbnails for each of the time divisions can be compared to determine important scenes from the various clips of the respective time division, step 146. Duplicated images and/or videos can be filtered out, leaving only important scenes for combination into the target video. For each thumbnail, feature detection can be applied to determine whether thumbnails of recorded videos and/or images are similar to each other by applying a similarity algorithm. If two or more thumbnails are too similar (e.g., the similarity result is greater than 90%), then only one is selected for combination into the target video.

In terms of weighting, the weights can be such that a video weight is greater than a photo weight, a photo weight is greater than a lifelog video weight, and so on and so forth. Furthermore, a weight for a video can be increased based on a duration of the video, where the longer the video, the larger the weight. It can be appreciated that other weighting methodology can be used in conjunction of the present disclosure.

Lastly, the important scenes can be transmitted and then combined into a video collection, step 148. In such manner, the video collection can be automatically generated to provide a summary of important video scenes in the single target video.

Figure 7:
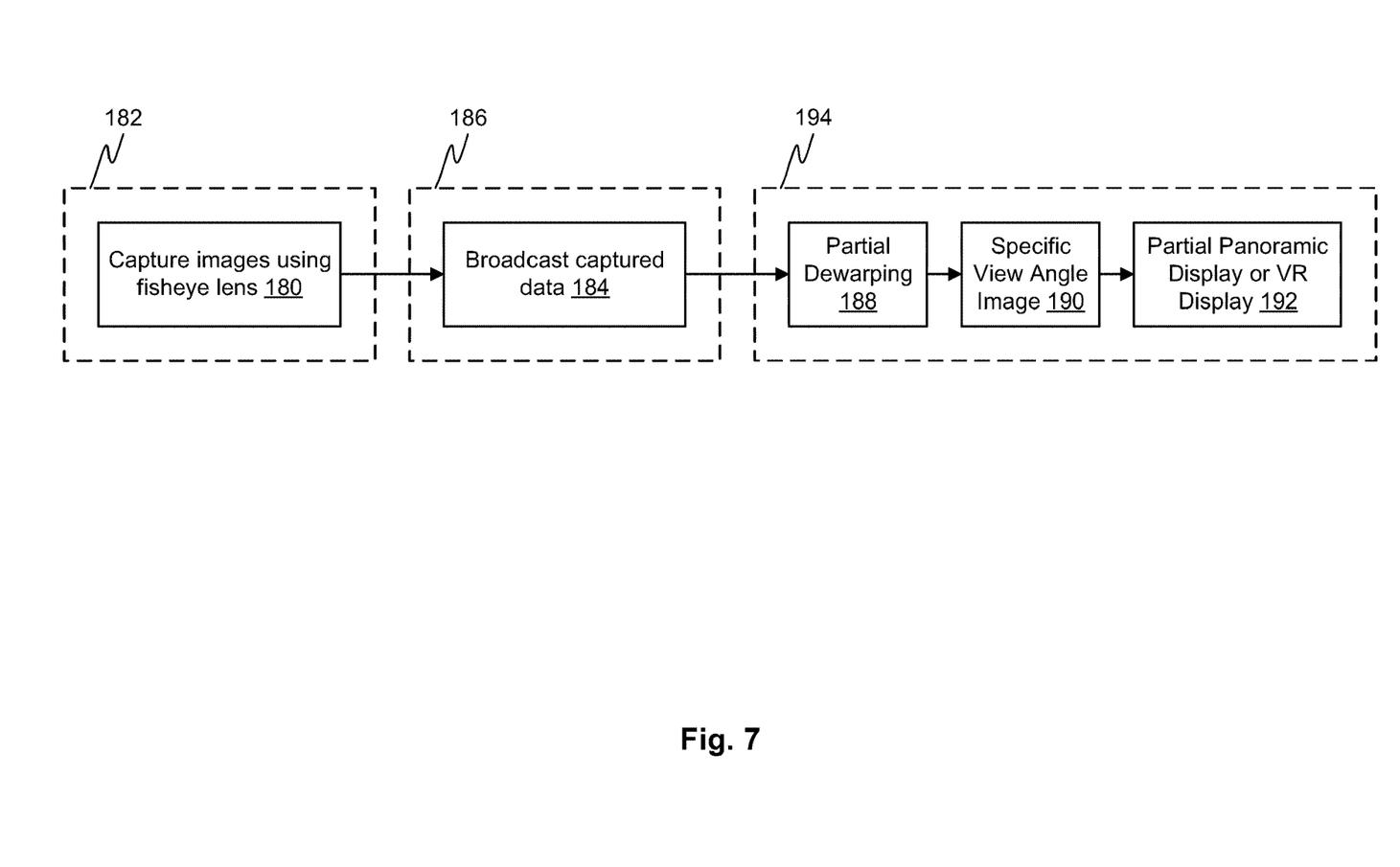
FIG. 7 illustrates a flow chart for a video broadcasting method of the present disclosure.

FIG. 7 illustrates a flow chart for a video broadcasting method of the present disclosure. In video broadcasting, a camera 182 can record video for broadcasting by uploading the video to a server 186. The server 186 can then transmit the received video to a viewer 194.

The camera 182 can use a fisheye lens to capture images for the video, step 180. The captured video is received by the server 186, which in turn broadcasts the captured video, step 184, to one or more viewers. On the viewer's side, the viewer can partially dewarp the video, step 188, and generate a specific view angle image, step 190, for the viewer. Thereby, a partial panoramic display or partial virtual reality ("VR") display can be displayed, step 192. As the viewer selects a different view angle, the dewarping step can be performed on the different view angle to display that view. Thereby, dewarping on the video data is performed on demand in response to any changing views by the viewer. This can reduce the amount of computational power for dewarping significantly since dewarping is only performed as needed depending on the view angle of the viewer.

Figure 8:
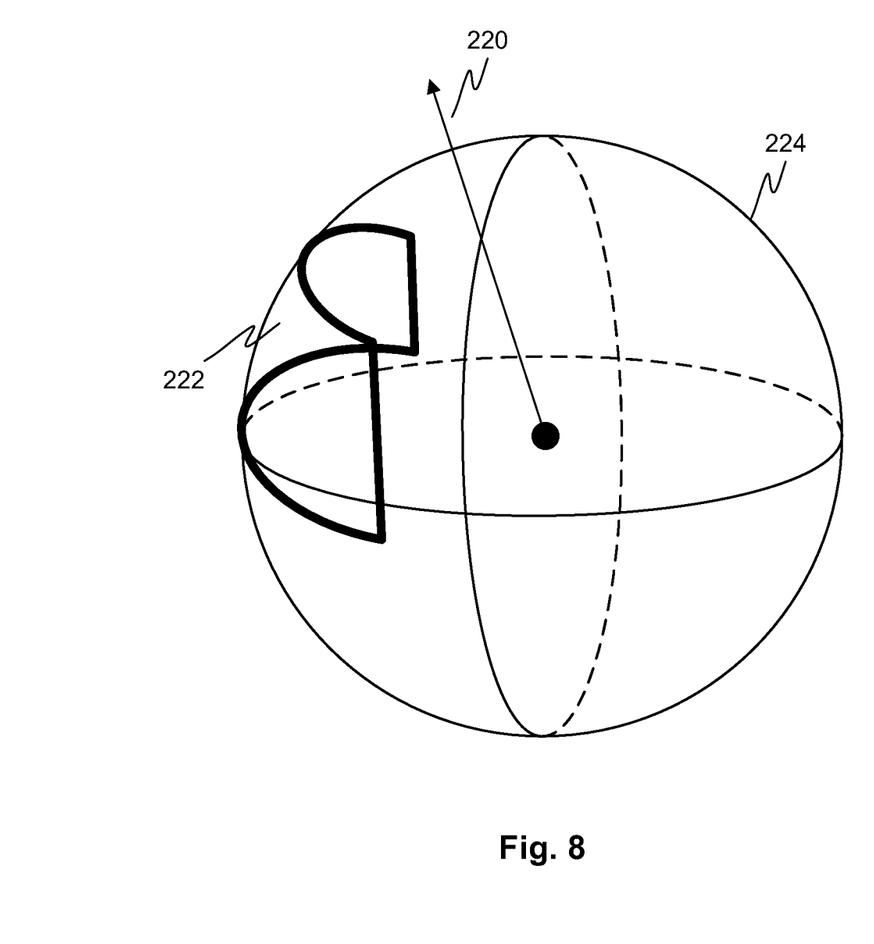
FIG. 8 illustrates a sphere that represents the viewable angles of a virtual reality video.

FIG. 8 illustrates a sphere that represents the viewing angles of a virtual reality video. A spherical view 224 can represent possible view angles of a viewer in which the viewer can view recorded video. A camera forward direction 220 can represent the recording angle of a camera for the video. A viewing window 222 represents the displayed viewing image that the viewer is currently viewing. The viewer has the freedom to rotate his/her view around the sphere 224 and thus move the viewing window 222 around the sphere 224 to see image data in those viewing angles.

In the context of dewarping, the dewarping of the streamed video data for the spherical view may only have to be performed on the video data in the viewing window. Any other image data outside the viewing window can be on standby and not processed until the viewer moves the viewing window to overlap that other image data. At this time, pixels in the other image data can be dewarped on demand and then displayed to the viewer.

Figure 9:
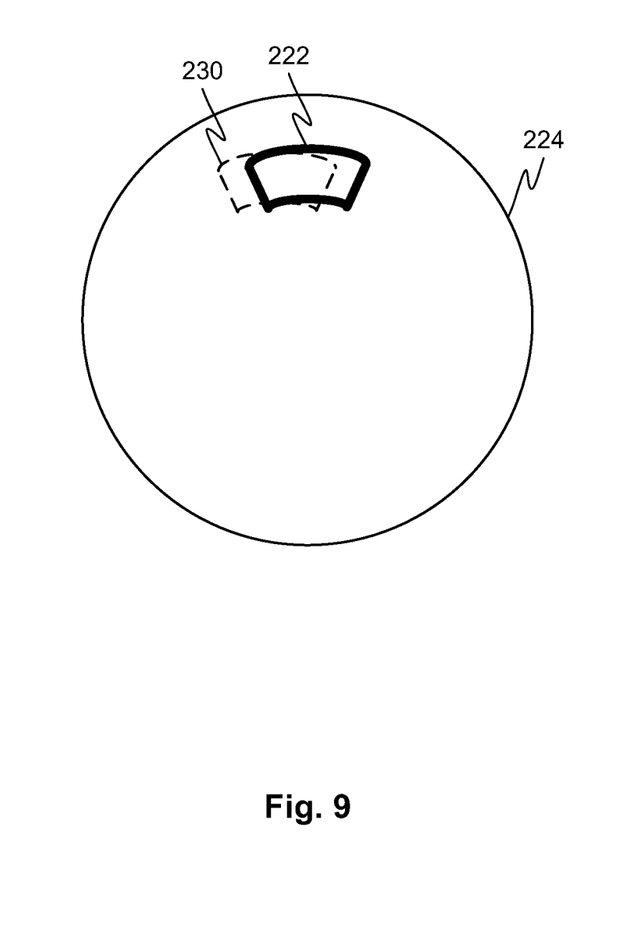
FIG. 9 illustrates a viewing window shifting within a sphere that represents viewable angles of a virtual reality video.

FIG. 9 illustrates a viewing window shifting within a sphere that represents viewable angles of a virtual reality video. In a further idealization, the spherical view 224 can be further idealized into two dimensions ("2-D"), where the viewing window 222 can be shown in that 2-D view. A next viewing window 230 can overlap the viewing window 222. For the portion in the next viewing window 230 that does not overlap the viewing window 222, a viewer can dewarp the portion on the fly to provide an image to display.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not taught to be exhaustive or to limit the embodiments to the precise forms disclosed. Many modifications and variations are possible in view of the above teachings.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. Furthermore, it is appreciated that the terms such as "first", "second", "third", etc. may be used to distinguish between elements such terms describe. These terms are not necessarily intended to indicate temporal or prioritization of such elements, unless otherwise explicitly stated.

As noted, the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. The computer-readable medium may be understood to include one or more computer-readable media of various forms, in various examples.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as performing or being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory ("RAM") such as synchronous dynamic random access memory ("SDRAM"), read-only memory ("ROM"), non-volatile random access memory ("NVRAM"), electrically erasable programmable read-only memory ("EEPROM"), flash memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors ("DSPs"), general purpose microprocessors, an application specific integrated circuits ("ASICs"), field programmable logic arrays ("FPGAs"), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined encoder-decoder ("CODEC").

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

We claim:

1. A video stabilization computer-program product tangibly embodied in a non-transitory machine-readable storage medium, including instructions configured to cause one or more data processors to perform actions including:
   synchronizing gyro data and acceleration data with a frame of video data;
   fusing the gyro data and the acceleration data to get a space domain rotation matrix that corresponds to the frame;
   adjusting the frame based on the space domain rotation matrix;
   detecting at least one feature of the adjusted frame;
   determining a modified rotation matrix by comparing the at least one detected feature of the adjusted frame with a corresponding feature in a neighboring frame of the video data; and
   adjusting the adjusted frame based on the modified rotation matrix.

2. The video stabilization computer program product of claim 1, in the synchronizing step, wherein the gyro data, the acceleration data, and the frame data are each timestamped, and wherein the gyro data, the acceleration data, and the frame data are synchronized based on the respective timestamps of the gyro data, the acceleration data, and the frame.

3. The video stabilization computer program product of claim 1, in the fusing step, wherein a Kalman filter is applied to the gyro data and the acceleration data.

4. The video stabilization computer program product of claim 1, in the adjusting the frame step, wherein an inverse of the space domain rotation matrix is applied to pixels of the frame.

5. The video stabilization computer program product of claim 1, in the determining the modified rotation matrix step, further comprising the steps of:
   identifying the corresponding feature in the neighboring frame of the video data that matches the at least one detected feature of the adjusted frame;
   calculating the pixel space domain rotation by comparing pixels of the detected feature of the adjusted frame with corresponding pixels of the corresponding feature in the neighboring frame; and
   generating the modified rotation matrix based on the calculated pixel space domain rotation.

6. The video stabilization computer program product of claim 1, in the adjusting the adjusted frame step, wherein an inverse of the modified rotation matrix is applied to pixels of the adjusted frame.

7. The video stabilization computer program product of claim 1, in the adjusting the frame step, wherein if a corresponding rotation angle for the space domain rotation matrix is greater than a first predefined angle, then the space domain rotation matrix is adjusted to set the corresponding rotation angle to a second predefined angle, wherein the second predefined angle is less than the first predefined angle, and wherein an inverse of the adjusted space domain rotation matrix is applied to pixels of the frame.

8. A system for video stabilization, the system comprising:
   an image sensor;
   a gyro sensor;
   an accelerometer;
   one or more data processors; and
   a non-transitory computer readable storage medium containing instructions which, when executed by the one or more data processors, cause the one or more data processors to perform actions including:
      synchronizing gyro data and acceleration data with a frame of video data;
      fusing the gyro data and the acceleration data to get a space domain rotation matrix that corresponds to the frame;
      adjusting the frame based on the space domain rotation matrix;
      detecting at least one feature of the adjusted frame;
      determining a modified rotation matrix by comparing the at least one detected feature of the adjusted frame with a corresponding feature in a neighboring frame of the video data; and
      adjusting the adjusted frame based on the modified rotation matrix.

9. The system for video stabilization of claim 8, in the synchronizing step, wherein the gyro data, the acceleration data, and the frame data are each timestamped, and wherein the gyro data, the acceleration data, and the frame data are synchronized based on the respective timestamps of the gyro data, the acceleration data, and the frame.

10. The system for video stabilization of claim 8, in the fusing step, wherein a Kalman filter is applied to the gyro data and the acceleration data.

11. The system for video stabilization of claim 8, in the adjusting the frame step, wherein an inverse of the space domain rotation matrix is applied to pixels of the frame.

12. The system for video stabilization of claim 8, in the determining the modified rotation matrix step, further comprising the steps of:
   identifying the corresponding feature in the neighboring frame of the video data that matches the at least one detected feature of the adjusted frame;
   calculating the pixel space domain rotation by comparing pixels of the detected feature of the adjusted frame with corresponding pixels of the corresponding feature in the neighboring frame; and
   generating the modified rotation matrix based on the calculated pixel space domain rotation.

13. The system for video stabilization of claim 8, in the adjusting the adjusted frame step, wherein an inverse of the modified rotation matrix is applied to pixels of the adjusted frame.

14. The system for video stabilization of claim 8, in the adjusting the frame step, wherein if a corresponding rotation angle for the space domain rotation matrix is greater than a first predefined angle, then the space domain rotation matrix is adjusted to set the corresponding rotation angle to a second predefined angle, wherein the second predefined angle is less than the first predefined angle, and wherein an inverse of the adjusted space domain rotation matrix is applied to pixels of the frame.

15. A computer-implemented method for video stabilization, the method comprising: synchronizing gyro data and acceleration data with a frame of video data;

fusing the gyro data and the acceleration data to get a space domain rotation matrix that corresponds to the frame;

adjusting the frame based on the space domain rotation matrix;

detecting at least one feature of the adjusted frame;

determining a modified rotation matrix by comparing the at least one detected feature of the adjusted frame with a corresponding feature in a neighboring frame of the video data; and adjusting the adjusted frame based on the modified rotation matrix, wherein an inverse of the modified rotation matrix is applied to pixels of the adjusted frame.

16. A computer-implemented method of claim 15, in the synchronizing step, wherein the gyro data, the acceleration data, and the frame data are each timestamped, and wherein the gyro data, the acceleration data, and the frame data are synchronized based on the respective timestamps of the gyro data, the acceleration data, and the frame.

17. A computer-implemented method of claim 15, in the fusing step, wherein a Kalman filter is applied to the gyro data and the acceleration data.

18. A computer-implemented method of claim 15, in the adjusting the frame step, wherein an inverse of the space domain rotation matrix is applied to pixels of the frame.

19. A computer-implemented method of claim 15, in the determining the modified rotation matrix step, further comprising the steps of:

identifying the corresponding feature in the neighboring frame of the video data that matches the at least one detected feature of the adjusted frame;

calculating the pixel space domain rotation by comparing pixels of the detected feature of the adjusted frame with corresponding pixels of the corresponding feature in the neighboring frame; and generating the modified rotation matrix based on the calculated pixel space domain rotation.

20. A computer-implemented method of claim 15, in the adjusting the frame step, wherein if a corresponding rotation angle for the space domain rotation matrix is greater than a first predefined angle, then the space domain rotation matrix is adjusted to set the corresponding rotation angle to a second predefined angle, wherein the second predefined angle is less than the first predefined angle, and wherein an inverse of the adjusted space domain rotation matrix is applied to pixels of the frame.

* * * * *